United States Patent
Böckle

(10) Patent No.: US 9,451,673 B2
(45) Date of Patent: Sep. 20, 2016

(54) DEVICE FOR CONTROLLING A LIGHTING DEVICE

(75) Inventor: Reinhard Böckle, Mäder (AT)

(73) Assignee: TRIDONIC GMBH & CO KG, Dornbirn (AT)

( * ) Notice: Subject to any disclaimer, the term of this patent is extended or adjusted under 35 U.S.C. 154(b) by 275 days.

(21) Appl. No.: 14/114,191

(22) PCT Filed: Apr. 30, 2012

(86) PCT No.: PCT/AT2012/000120
§ 371 (c)(1),
(2), (4) Date: Dec. 30, 2013

(87) PCT Pub. No.: WO2012/145775
PCT Pub. Date: Nov. 1, 2012

(65) Prior Publication Data
US 2014/0103834 A1  Apr. 17, 2014

(30) Foreign Application Priority Data

Apr. 29, 2011  (DE) .................. 10-2011-100-002

(51) Int. Cl.
H05B 37/02  (2006.01)
H05B 39/04  (2006.01)
H05B 39/08  (2006.01)

(52) U.S. Cl.
CPC .......... *H05B 37/02* (2013.01); *H05B 37/0263* (2013.01); *H05B 39/044* (2013.01); *H05B 39/08* (2013.01)

(58) Field of Classification Search
USPC ................................. 315/291–311
See application file for complete search history.

(56) References Cited

U.S. PATENT DOCUMENTS

| | | | |
|---|---|---|---|
| 5,030,890 A * | 7/1991 | Johnson | H02M 5/2573 315/208 |
| 5,471,116 A | 11/1995 | Schiller | |
| 8,400,077 B2 | 3/2013 | Huang et al. | |
| 8,963,535 B1 * | 2/2015 | Melanson | G01R 33/07 307/116 |
| 9,030,122 B2 * | 5/2015 | Yan | H05B 33/0818 315/291 |
| 2003/0098659 A1 * | 5/2003 | Okamoto | H05B 41/2928 315/291 |
| 2004/0085030 A1 | 5/2004 | Laflamme et al. | |
| 2007/0182347 A1 * | 8/2007 | Shteynberg | H05B 33/0815 315/312 |
| 2012/0280638 A1 * | 11/2012 | Pereira | H05B 33/0842 315/297 |
| 2013/0049621 A1 * | 2/2013 | Yan | H05B 33/0848 315/205 |
| 2014/0055055 A1 * | 2/2014 | Melanson | H02M 3/335 315/228 |

FOREIGN PATENT DOCUMENTS

| | | |
|---|---|---|
| CN | 1122098 A | 5/1996 |
| TW | 201101926 A | 1/2011 |
| WO | 2006/006085 A1 | 1/2006 |

* cited by examiner

*Primary Examiner* — Brandon S Cole
(74) *Attorney, Agent, or Firm* — Volpe and Koenig, P.C.

(57) ABSTRACT

A device is provided for controlling an illumination device (50), including a control circuit (110) having an input (102) for coupling to a network voltage conductor (30) and an output (104) for coupling to a supply voltage conductor (40) of the illumination device (50). The control circuit (110) is designed to supply a supply voltage and control signals modulated onto the supply voltage to the illumination device (50) via the output (104). A button (120) influences the generation of the control signals. The control circuit (110) produces an internal supply voltage (Vint) from a voltage which reduces between the input (102) and the output (104) of the control circuit. In the non-actuated state, the button (120) bypasses the input (102) and the output (104) of the control circuit (110).

15 Claims, 4 Drawing Sheets

DEVICE FOR CONTROLLING A LIGHTING DEVICE

FIELD OF THE INVENTION

The present invention relates to a device for controlling a lighting device.

BACKGROUND

It is known to use dimmers for brightness control of a lighting device. In lighting devices operating on the basis of conventional lamps such as incandescent bulbs, brightness regulation can take place in the dimmer via phase gating control or phase chopping control of the supply voltage of the lighting device. In the process, the power of the lighting device is reduced by virtue of a short-term interruption to the supply voltage being effected after or prior to the zero crossing of the supply voltage, with the result that, depending on the duration of the interruption, the power of the lighting device is reduced.

Furthermore, it is also known to use control devices in which brightness control takes place via special control signals which are transmitted to the lighting device. Electronic control gear (ECG) provided in the lighting device evaluates these control signals and adjusts the brightness correspondingly. This type of control is suitable in particular for lighting devices which are based on lamps in the form of gas discharge lamps or light-emitting diodes.

SUMMARY

The object of the invention is to provide a device for controlling a lighting device which is suitable for lighting devices based on non-conventional lamps, has a simple design and can be installed with little complexity.

This object is achieved by a device and a method as claimed in the independent claims. The dependent claims define developments of the invention.

In accordance with one exemplary embodiment, the device therefore comprises a control circuit having an input for coupling to a system voltage conductor and an output for coupling to a supply voltage conductor of the lighting device. The control circuit is configured to supply a supply voltage and control signals modulated onto the supply voltage to the lighting device via the output. The control circuit is configured to modulate control signals by phase gating control and/or phase chopping control as digitally encoded information items onto the supply voltage of the lighting devices.

Furthermore, the device comprises a switch, with it being possible for the generation of the control signals to be influenced by the actuation of said switch. For example, by actuating the switch, control signals can be generated which effect brightness control of the lighting device. However, other control operations are also possible, for example color control. The device can comprise one or more further operating elements, such as a potentiometer, for example. The potentiometer can be coupled to a swivel head, for example, through which the desired brightness can be adjusted.

The control circuit is configured to generate an internal supply voltage from a voltage which is in the form of a voltage drop between the input and the output of the control circuit. In a non-actuated state, the button bypasses the input and the output of the control circuit.

This means that a voltage supply to the control circuit only takes place on actuation of the switch, with the result that the amount of power drawn by the entire arrangement is reduced. Furthermore, no special lines for voltage supply to the control circuit are required, with the result that the installation complexity is reduced. Furthermore, the device is suitable for so-called one-wire wiring, in which the device is connected to a system voltage source via only one conductor and is furthermore connected to the lighting device via only one conductor. If this conductor for coupling to the system voltage source is a phase conductor, for example, a connection to the neutral conductor of the system voltage source is not required in order to ensure the supply of power to the control circuit. However, it goes without saying that the device is not restricted to use with a phase conductor or a neutral conductor.

In accordance with an exemplary embodiment, the control circuit comprises a semiconductor component and is configured such that, on actuation of the switch, an operating current of the lighting device flows via the semiconductor component. In this case, the control circuit is in particular configured to derive the internal supply voltage from a voltage drop across the semiconductor component. The semiconductor component can comprise a transistor as controllable switch. Owing to a nonlinear characteristic of the semiconductor component, in this case the internal supply voltage can be derived in an advantageous manner and in particular has a low dependency on the value of the operating current if said operating current exceeds a threshold current in the nonlinear characteristic of the semiconductor component.

If the semiconductor component comprises a thyristor, the control circuit can further be configured to modulate the control signals by actuation of the thyristor onto the supply voltage of the lighting device. In this way, a particularly simple design of the control circuit results.

In one exemplary embodiment, the control circuit can furthermore comprise a capacitor, which is coupled in parallel with the semiconductor component in order to be charged by the voltage drop across the semiconductor component. In this way, a variation in the voltage drop across the semiconductor component over time can be taken into consideration and the energy stored in the capacitor can be used for operation of DC components of the control circuit.

In one exemplary embodiment, the modulation circuit can also have a controllable switch such as a transistor, for example, and can be configured such that an operating current of the lighting device flows via the controllable switch. In this case, the control circuit can be configured to modulate the control signals by actuation of the controllable switch onto the supply voltage of the lighting device as well. The use of a controllable switch enables flexible generation of the control signals and can be used, for example, in combination with a controller for digitally encoding the control signals. In some exemplary embodiments, the control circuit therefore comprises a controller fed by the internal supply voltage. However, it goes without saying here that the controller could also be used for actuating a thyristor.

In accordance with one exemplary embodiment, the control circuit is configured to modulate the control signals by phase gating control and/or phase chopping control onto the supply voltage of the lighting device. In this case, predetermined phase gating control or phase chopping control can be used, as the control signals can be encoded by virtue of the presence or absence of said phase gating or phase chopping control. The degree of phase gating control therefore does not need to be varied and is preferably selected to be constant during a small proportion of the period of the supply voltage of the lighting device, with the result that distortion of the supply voltage by the control signals is as low as possible. In accordance with one exemplary embodiment, the phase gating control or the phase chopping control is less than 20% of the period of the supply voltage of the lighting device.

For example, the phase gating control or phase chopping control is 10-15% of the period of the supply voltage of the lighting device, with the result that, firstly, reliable detection of the control signals in the lighting device and secondly, low distortion of the supply voltage are ensured.

The use of a controllable switch such as a transistor, for example, provides the advantage that different types of signal forms are possible, for example phase gating control or phase chopping control. In contrast to the use of a thyristor, in addition there is not the problem of a holding current, as a result of which even low loads can be actuated without any problems without the need for a base load.

Furthermore, in one exemplary embodiment, the phase gating control or phase chopping control can only take place in one half-cycle of the supply voltage. This firstly provides the advantage that the control circuit can be realized with little complexity in terms of circuitry and furthermore limits in an advantageous manner the distortion of the supply voltage by the control signals.

The control signals can be used for brightness control of the lighting device, i.e. for dimming the light generated by means of the lighting device. Additionally/alternatively, the control signals can also be used for other control operations, for example for color control of the lighting device, which is of interest for lighting devices with lamps on the basis of light-emitting diodes.

It goes without saying that the device can be used with one or more lighting devices which are configured for processing control signals. For this purpose, at least one corresponding lighting device is coupled to the device via the supply voltage conductor, with the result that it can be controlled by the control signals. The processing of the control signals in the lighting device can take place, for example, via ECG.

The invention also relates to a method for controlling a lighting device, wherein a control circuit is configured to supply a supply voltage for the lighting device and control signals modulated onto the supply voltage to the lighting device, and wherein the control circuit modulates the control signals by phase gating control and/or phase chopping control as digitally encoded information items onto the supply voltage of the lighting devices.

BRIEF DESCRIPTION OF THE DRAWINGS

Further features, advantages and functions of exemplary embodiments of the invention will become clear from the detailed description below with reference to the attached drawings.

DETAILED DESCRIPTION OF THE PREFERRED EMBODIMENTS

Figure 1:
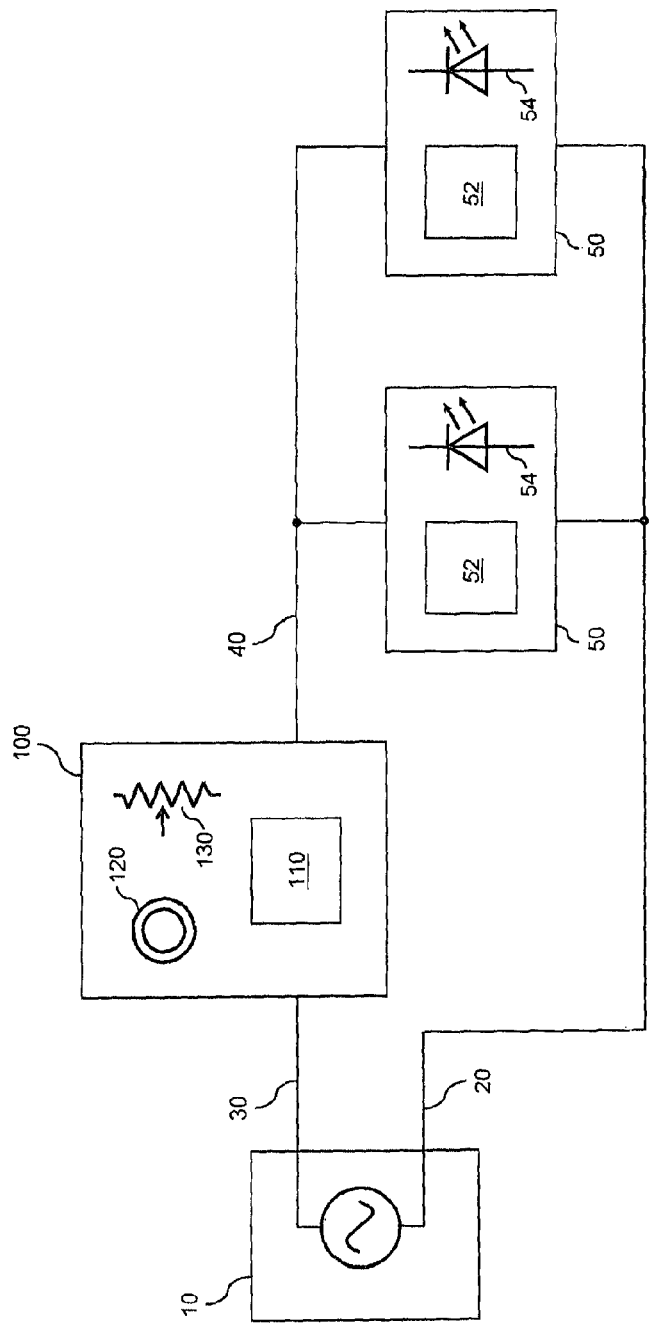
FIG. 1 shows a system comprising a device in accordance with an exemplary embodiment of the invention and lighting devices controlled by the device.

FIG. 1 illustrates a system comprising a device 100 in accordance with an exemplary embodiment of the invention. The system comprises, in addition to the device 100, a system voltage source 10 and lighting devices 50. The lighting devices 50 are controlled by the device 100. In the explanations below, it should be assumed that the device 100 is used for brightness control of the lighting devices 50, i.e. is in the form of a dimmer. However, it goes without saying that the device 100 could also be used for other or additional control operations, for example for color control of the lighting devices 50.

The lighting devices 50 each comprise ECG 52 and lamps 54, which are illustrated as light-emitting diodes in the present example. It goes without saying here that the lamps 54 could be implemented in a variety of ways, for example by one or more light-emitting diodes, by one or more gas discharge lamps or else by one or more conventional incandescent bulbs. Furthermore, any desired combination of the mentioned types of lamps can also be used. A suitable operation of the respective lamp 54 takes place via the ECG 52. For this purpose, the ECG 52 can comprise, for example, a suitable switched mode power supply, which generates supply signals suitable for operation of the lamp 54 from a supply voltage supplied to the lighting device.

It goes without saying that the number of lighting devices 50 illustrated in FIG. 1 is merely by way of example and the system could also be implemented with only one lighting device 50 or with any desired larger number of lighting devices 50.

A system voltage conductor 20 starting from the system voltage source 10 is connected to the lighting devices 50. A further system voltage conductor 30 starting from the system voltage source 10 is connected to the device 100. It should be assumed below that the system voltage conductor 20 is a neutral conductor while the system voltage conductor 30 is a phase conductor. However, it goes without saying that other configurations for the system voltage conductor 20 and the system voltage conductor 30 are also possible and can be selected corresponding to the type of connection of the lighting device 50. The device 100 is in turn connected to the lighting devices 50 via a supply voltage conductor 40. The lighting devices 50 are coupled in parallel between the system voltage conductor 20 and the supply voltage conductor 40 and draw their supply voltage via the supply voltage conductor 40 and the system voltage conductor 20. The supply voltage for the lighting devices is thus supplied to said lighting devices firstly, via the system voltage conductor 20 and secondly, via the system voltage conductor 30, the supply voltage conductor 40 and the device 100 coupled therebetween. Since the device 100 is only directly connected to one of the system voltage conductors 20, 30, the design illustrated in FIG. 1 corresponds to a so-called one-wire interconnection. A connection of the device 100 to the system voltage line 20 is not necessary, which reduces installation complexity.

The device 100 comprises a control circuit 110 and, for example, a button 120. The control circuit 110 has the task of modulating control signals onto the supply voltage of the lighting devices 50. The device 100 can comprise one or more further operating elements, which is illustrated in the example in FIG. 1 by a potentiometer 130. The potentiometer 130 can be coupled, for example, to a swivel head, via which the desired brightness can be adjusted. In this case, the device 100 can detect the position of the potentiometer 130 on actuation of a button 120 and generate control signals for adjusting the corresponding brightness via the control circuit 110 and transmit said control signals to the lighting devices 50. By a combination of various operating elements with the button 120, a wide variety of control operations can be realized.

For example, brightness control could take place via the potentiometer 130, whereas color control could take place via the button 120. The control signals are preferably transmitted as digitally encoded information items.

The generation of the control signals can also be capable of being influenced by actuation of the button 120. For example, on actuation of the button 120, control signals can be generated which instruct the lighting devices 50 to implement a brightness change. For example, by actuation of the switch, the brightness can be increased by in each case one increment until a maximum brightness is reached, and then, by actuation of the button 120, the brightness can again be reduced by in each case one increment until a minimum brightness is reached. Furthermore, in the case of permanent actuation of the switch, the brightness could be changed automatically periodically and the brightness set when the button 120 is released could be maintained. It goes without saying that, furthermore, a wide variety of other possibilities for controlling the lighting devices 50 via the button 120 are provided.

Figure 2:
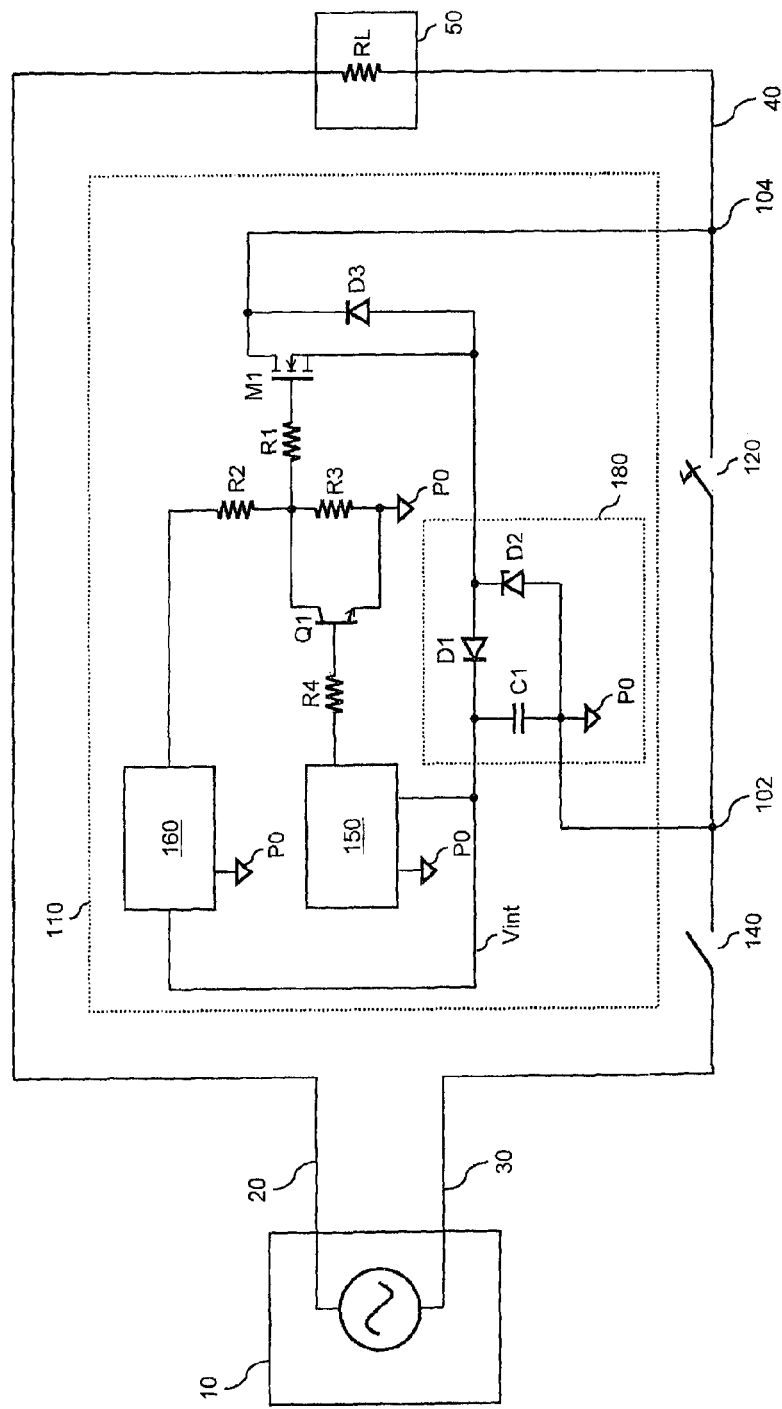
FIG. 2 shows, schematically, an implementation of the device in accordance with an exemplary embodiment of the invention.

FIG. 2 illustrates, schematically, an implementation of the control circuit 110 in the device 100 shown in FIG. 1. FIG. 2 illustrates, by way of example, only one lighting device 50, which has a load resistor RL. However, it goes without saying that, as mentioned above, further lighting devices could also be provided. Furthermore, FIG. 2 also illustrates a mains switch 140, which may be a further operating element of the device 100 or a switch which is provided separately from the device 100.

As illustrated in FIG. 2, the control circuit 110 comprises an input 102, which is used for connection to the system voltage line 30, and an output 140, which is used for connection to the supply voltage line 40. The button 120 is coupled between the input 102 and the output 104, with the result that, on actuation of the button 120, the input 102 and the output 104 are electrically bypassed. The mains switch 140 is coupled between the system voltage source 10 and the input 102.

The control circuit 110 is configured to effect the modulation of the supply voltage with the control signals by means of a transistor M1. The transistor M1 is coupled between the input 102 and the output 104 of the control circuit 110 in such a way that an operating current of the lighting device 50 flows through the transistor M1. By actuation of the transistor M1, the supply voltage can consequently be modulated with the control signals.

In the example illustrated, the transistor M1 is a field-effect transistor, in a particular a field-effect transistor of the MOSFET type. However, it goes without saying that other types of transistor could also be used.

Furthermore, the control circuit 110 for generating the control signals comprises a controller 150, a DC-to-DC converter 160 and an amplifier circuit comprising resistors R1, R2, R3, R4 and a transistor Q1, which are coupled in the manner illustrated in FIG. 2 between an output of the controller 150 and a control terminal of the transistor M1. The amplifier circuit serves to amplify output signals from the controller 150 to a signal level suitable for actuating the transistor M1. The DC-to-DC converter 160 produces a voltage required for the operation of the amplifier circuit, for example a DC voltage of 12-15 volts. The DC-to-DC converter 160 can be implemented, for example, on the basis of a charge pump. However, it goes without saying that in some exemplary embodiments, the output signal of the controller 150 itself could also already be suitable for actuating the transistor M1, with the result that it would be possible to dispense with the amplifier circuit and the DC-to-DC converter 160.

In the exemplary embodiment illustrated, the transistor Q1 is a bipolar transistor, for example an npn transistor. The resistors R1, R2, R3 and F4 are dimensioned suitably corresponding to the signal levels used.

Furthermore, the control circuit 110 in the exemplary embodiment illustrated in FIG. 2 comprises a supply circuit 180, which generates an internal supply voltage Vint of the control circuit 110 from a voltage which is in the form of a voltage drop between the input 102 and the output 104 of the control circuit 110. This internal supply voltage Vint is used for operating the controller 150, the DC-to-DC converter 160 and the amplifier circuit.

As illustrated, the supply circuit 180 comprises a diode D1, a further diode D2 and a capacitor C1. The diode D2 is a Zener diode. The diode D2 is coupled in series with the transistor M1, with the result that the operating current of the lighting device 50 flows through the diode D1 when the button 120 is actuated. The capacitor C1 is coupled to the diode D1 in parallel with the diode D2, with the result that the capacitor C1 is charged by a voltage drop across the diode D2, which takes place, owing to the diode D1, during the negative half-cycle of the supply voltage. The diode D1 can be a silicon diode.

The variations in the voltage drop across the diode D2 over time are averaged out by means of the capacitor C1 and energy storage takes place, with the result that the internal supply voltage Vint generated by the supply circuit 180 substantially corresponds to a DC voltage. The capacitor C1 can be dimensioned, for example, in the region of a few μF. In the exemplary embodiment illustrated in FIG. 2, a DC voltage reference point P0 is formed at a terminal of the capacitor C1, which terminal is connected to the input 102 of the control circuit 110.

Furthermore, the control circuit 110 in the exemplary embodiment illustrated in FIG. 2 comprises a further diode D3, which is connected in parallel with the transistor M1, as illustrated in FIG. 2. The diode D3 can be a silicon diode.

If, in the exemplary embodiment illustrated in FIG. 2, the mains switch 140 is closed, in the non-actuated state of the button 120 the system voltage provided by the system voltage source 10 is present directly as supply voltage at the lighting device 50. This is due to the fact that, in the non-actuated state of the button 120, said button electrically bypasses the input 102 and the output 104 of the control circuit 110, with the result that the control circuit 110 does not have any energy supplied to it. In this way, the control circuit 110 is prevented from drawing power in the non-actuated state of the button 120.

In the actuated state of the button 120, i.e. when the button is pressed, however, the electrical bypassing of the input 102 and the output 104 of the control circuit 110 is interrupted, with the result that the operating current of the lighting device 50 flows via the input 102 and the output 104 of the control circuit 110 through the control circuit 110. In particular, the operating current flows through the diode D2, the transistor M1 and the diode D3, which is connected in parallel with the transistor M1.

In this state, the capacitor C1 is charged by the voltage drop across the diode D2 and stores energy for generating the internal supply voltage Vint. This takes place due to the polarities of the diodes D1 and D2 illustrated in FIG. 2 during the negative half-cycle. Owing to the internal supply voltage Vint, the controller 150 and the DC-to-DC converter 160 are supplied with energy, with the result that the control signals are modulated onto the supply voltage corresponding to the programming of the controller 150.

For example, the controller 150 can detect the position of a potentiometer, for example of the potentiometer 130 in FIG. 1, and generate the control signals corresponding to the established position of the potentiometer and preferably transmit these control signals as digitally encoded information items. However, it is also possible for only the information "button pressed" to be transmitted to the lighting device 50 via the control signals.

Figure 3:
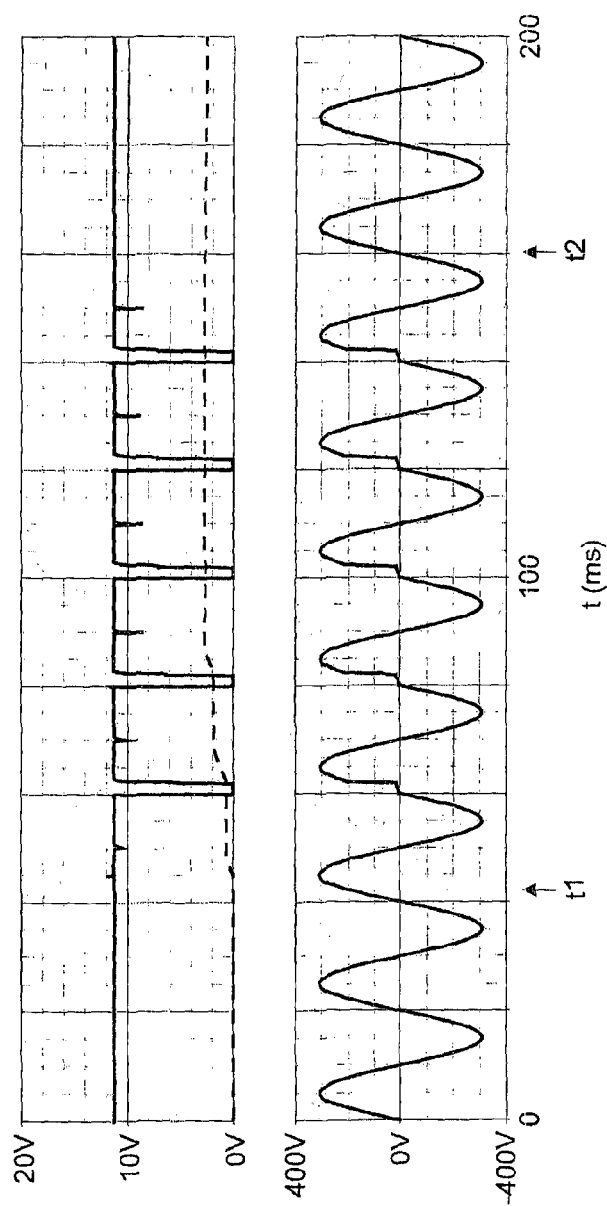
FIG. 3 illustrates the mode of operation of the device on the basis of simulation results.

FIG. 3 illustrates, on the basis of simulation results, the way in which the control circuit 110 illustrated in FIG. 3 functions. The graph at the top in FIG. 3 illustrates, by means of a continuous line, the voltage used for actuating the transistor M1, whereas a dashed line illustrates the profile of the internal supply voltage Vint. The diagram at the bottom illustrates the profile of the supply voltage supplied to the lighting device 50. During the simulation, it has been assumed that, at time t1=45 ms, the button 120 is pressed and, at time t2=160 ms, the button 120 is released again.

As can be seen in FIG. 3, after actuation of the button at time t1, the internal supply voltage Vint increases and, after a few periods of the supply voltage, reaches a substantially constant value. At the time of the positive zero crossing of the supply voltage, an interruption to the actuation of the transistor M1 then takes place, with the result that the transistor M1 turns off for a predetermined period. As a result, the supply voltage remains substantially at zero for this period during its positive zero crossing and the phase gating control illustrated in FIG. 3 of the positive half-cycle takes place. Care should be taken here to ensure that the predetermined period for which the actuation of the transistor M1 is interrupted is determined via the controller 150 and the magnitude of the resulting phase gating control is determined. In the example illustrated, a predetermined period of 2 ms has been selected, which, assuming a system frequency of 50 Hz, corresponds to phase gating control of 10% of the period of the system voltage. By virtue of the presence or absence of phase gating control in the supply voltage, the control signals are encoded. In this case, it goes without saying that the controller 150 can also have the effect, when the button 120 is pressed, that in certain half-cycles no phase gating control occurs. In this way, digital encoded information items can be transmitted via the control signal. For example, the presence of the phase gating control can encode a digital value "1", whereas the absence of phase gating control can encode a digital value "0".

In modified exemplary embodiments, the control signals can also be encoded in a different way, for example by phase chopping control, i.e. by actuation of the transistor M1 prior to a negative zero crossing of the supply voltage, or by actuation of the transistor M1 at other points in time. The actuation of the transistor M1 at the time of a zero crossing of the supply voltage is considered to be advantageous, however, since in this case only switch-on losses occur in the transistor M1. In the implementation illustrated, the first half-cycle of the supply voltage is used for generating the internal supply voltage Vint. However, it is also possible to use the second half-cycle or both half-cycles. In this case, the capacitor C1, the transistor M1 could be provided as controllable switch and the diodes D1 and D2 could alternatively or additionally be provided with reverse polarity. Furthermore, warm-up resistance could also be used from the drain terminal of the transistor M1 to the circuit node between the capacitor C1 and the diode D1.

As an alternative implementation of the control circuit 110, a thyristor can also be coupled between the input 102 and the output 104 of the control circuit 110, with the result that, when the button 120 is pressed, the operating current of the lighting device 50 flows through the thyristor. A diode can be coupled in parallel with the thyristor X1. Such an exemplary implementation of the control circuit 110, in comparison with the implementation shown in FIG. 2, provides a simplified design and can in particular dispense with the controller 150 and the DC-to-DC converter 160. Instead of this, a trigger circuit can be provided, via which the magnitude of a fixedly predetermined phase gating control is defined. In the case of such an implementation, as has been mentioned, a thyristor can be provided instead of the transistor M1. Other variant implementations of the trigger circuit can likewise be used. For example, the trigger circuit could also be implemented by means of a DIAC.

Therefore, control signals can be modulated in a similar way by phase gating control onto the supply voltage by means of an implementation of the control circuit 110 with a thyristor, as is illustrated in the diagram at the bottom in FIG. 3. In comparison to the implementation shown in FIG. 2, however, the control signals can merely also be used to indicate whether the button 120 has been actuated or not. In particular, the presence of the phase gating control can indicate an actuated state of the button 120.

In comparison with the implementation shown in FIG. 2, to this extent a simplified circuit design results in that the controller 150 and the DC-to-DC converter 160 can be dispensed with. Furthermore, the generation of the internal supply voltage Vint can also be simplified since no separate zener diode needs to be provided, but instead the voltage drop across the thyristor is used to generate the internal supply voltage Vint, wherein the thyristor is at the same time used for modulation of the supply voltage.

In one exemplary embodiment, the lighting device 50 can be compatible both with the implementation of the control circuit 110 shown in FIG. 2 and with the implementation of a control circuit 110 with a thyristor. This can be achieved by virtue of the fact that, when using a more complex digital encoding of the control signals, this is indicated by a special start sequence. For example, the controller 150 in the implementation shown in FIG. 2 could, on actuation of the switch, first generate in a predetermined half-cycle with phase gating control, with the result that, for example, a sequence of digital values "1101" is generated, which indicates that a more complex digital encoding follows. The simplified implementation with a trigger circuit, on the other hand, would generate a sequence corresponding to the digital values "1111" on actuation of the button 120, with the result that the lighting device can decide between the two implementations. Thus, the compatibility of the device can be increased by virtue of the controller 150 first generating a special start sequence on actuation of the button 120.

Figure 4:
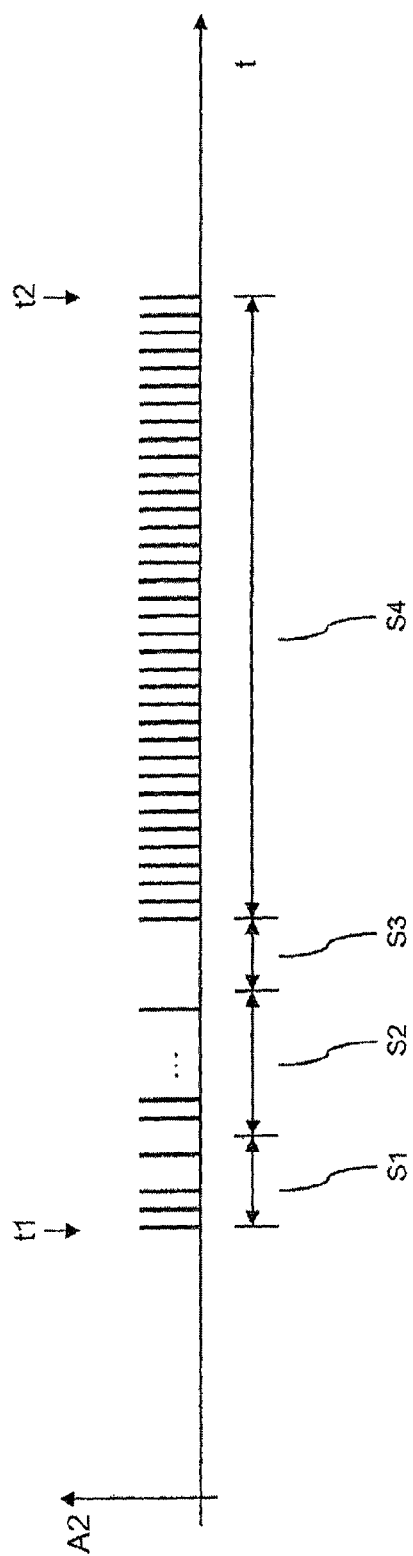
FIG. 4 illustrates, by way of example, control signals which can be evaluated in ECG in accordance with an exemplary embodiment of the invention.

An example of control signals used for transmitting digital information items is illustrated in FIG. 4. In FIG. 4, the time t1 in turn corresponds to the depression of the button 120 and the time t2 corresponds to the release of the button 120. It can be seen that the output signal A2 demonstrates pulses, while the button 120 is depressed. As explained in connection with FIG. 2, the modulation of the supply voltage can take place with the control signals only in certain half-cycles, with the result that information items can be digitally encoded in the control signals. This can be effected in the device 100 by means of a controller, for example the controller 150.

The control signals illustrated by way of example in FIG. 4 are divided into different sequences S1, S2, S3 and S4. The sequence S1 is a start sequence, by means of which the use of a more complex digital encoding can be indicated to the ECG 52. The start sequence can contain, for example, a "0" at a predetermined position.

By means of the start sequence, the ECG 52 can decide whether a control circuit with a controller is used in the device 100, such as in the implementation shown in FIG. 2, for example, or a simplified control circuit, as in the implementation with a trigger circuit, which is not capable of inserting, in a targeted manner, a "0" into the sequence in the control signals. For example, the sequence "1101" can be used as start sequence. In sequence S2, which can have a length of 8 bits, for example, digital information items can be encoded, for example a control command or the like. By means of the information items encoded in the sequence S2, it is also possible to indicate to the ECG 52 the way in which transmitted control signals will subsequently be used.

The sequence S3 can be a stop sequence, by means of which the end of the digital encoded information items is indicated.

The sequence S4 can in turn be a sequence of pulses for incrementally increasing or decreasing the brightness of the lighting device 50, i.e. each pulse in the sequence S4 can correspond, for example, to the increase or decrease in the brightness by one increment.

By virtue of digitally encoded information items being transmitted via the control signals, a wide variety of control functions can be realized in a simple manner in the ECG 52. For example, it could be possible to indicate to the ECG 52 by means of the information items encoded in the sequence S2 that the pulses in the sequence S4 are intended to be used for adjusting the brightness for a so-called corridor function. In the case of the corridor function, the lighting device 50 can be activated, for example, by a motion sensor and then dimmed to a predetermined brightness value once a predetermined time span has elapsed. This predetermined brightness value could be transmitted to the ECG 52 after corresponding indication in the information items of the sequence S2 via the sequence S4.

It goes without saying that, in order to implement this and other more complex control functionalities, the device 100 for generating the control signals can be equipped with corresponding operating elements.

The preceding concepts for controlling a lighting device therefore provide a low level of installation complexity. For example, existing dimmers which use "one-wire" circuitry can be replaced by the device according to the invention without additional lines needing to be laid.

Furthermore, the concepts for a wide variety of types of lighting devices on the basis of a wide variety of lamps are suitable. The device according to the invention, owing to its low degree of complexity, takes up only a small amount of space and can be arranged, for example, in a switch box. Finally, by virtue of the fact that distortion in the supply voltage of the lighting device is largely avoided, the requirements placed on the ECG of the lighting device are also less stringent. For example, base load reproduction can be dispensed with.

It goes without saying that, in the exemplary embodiments described in the text above, a wide variety of modifications are possible without departing from the scope of the invention. For example, individual circuit components can be replaced by similar components with comparable function. Furthermore, features of the individual implementations can also be combined with one another in a suitable manner. Thus, for example, the controller described with reference to FIG. 2 could also be used for actuating a thyristor. Furthermore, the control signals can also be modulated by phase gating control or phase chopping control of both half-cycles onto the supply voltage, which can be achieved, for example, by correspondingly doubling up on parts of the control circuit, possibly with reverse polarity of diodes or the like. By virtue of independent modulation of the positive and negative half-cycle with control signals, different information items can be transmitted simultaneously. For example, by virtue of modulation of a half-cycle, a brightness value can be transmitted, while, by modulation of the other half cycle a color value or the like is transmitted. However, it goes without saying that, by virtue of independent use of both half-cycles, a wide variety of other possibilities for transmission of different information items results. Finally, it goes without saying that the implementation of the control circuit 110 illustrated in FIG. 2 can be implemented by suitable circuitry of discrete components on a printed circuit board or can be integrated at least partially in a single semiconductor module.

What is claimed is:

1. A device (100) for controlling a lighting device (50), comprising:
    a control circuit (110) comprising an input (102) for coupling to a system voltage conductor (30) and an output (104) for coupling to a supply voltage conductor (40) of the lighting device (50), wherein the control circuit (110) is configured to supply a supply voltage for the lighting device (50) and control signals modulated to the supply voltage to the lighting device (50) via the output (104), and wherein the control circuit (110) is configured to modulate control signals by phase gating control and/or phase chopping control as digitally encoded information items onto the supply voltage of the lighting devices (50), wherein the control signal comprises a start sequence and a stop sequence at the end of the digitally encoded information and wherein the lighting device (50) comprises at least one lamp (54) and a switched mode power supply, which generates supply signals configured to operate the at least on lamp (54) from the supply voltage supplied to the lighting device (50).

2. The device (100) as claimed in claim 1, wherein the control signals are used for brightness and/or color control of the lighting device (50).

3. A system, comprising:
    a device (100) as claimed in claim 1, and
    at least one lighting device (50), which is coupled to the device (100) via the supply voltage conductor (40) and is controllable by the control signals.

4. A device (100) for controlling a lighting device (50), comprising:
    a control circuit (110) comprising an input (102) for coupling to a system voltage conductor (30) and an output (104) for coupling to a supply voltage conductor (40) of the lighting device (50), wherein the control circuit (110) is configured to supply a supply voltage for the lighting device (50) and control signals modulated to the supply voltage to the lighting device (50)

via the output (104), wherein the control circuit (110) is configured to modulate control signals by phase gating control and/or phase chopping control as digitally encoded information items onto the supply voltage of the lighting devices (50), the device (100) further comprising a button (120), through whose actuation, generation of the control signals is influenced, wherein the control circuit (110) is configured to generate an internal supply voltage (Vint) from a voltage which is in the form of a voltage drop between the input (102) and the output (104) of the control circuit (110), and wherein the button (120), in a non-actuated state, bypasses the input (102) and the output (104) of the control circuit.

5. The device (100) as claimed in claim 4, wherein the control circuit (110) further comprises a capacitor (C1; C3), which is coupled in parallel with a controllable switch (M1) in order to be charged by the voltage drop across the controllable switch (M1).

6. The device (100) as claimed in claim 5, wherein the controllable switch (M1) comprises a transistor.

7. The device (100) as claimed in claim 5, wherein the control circuit (110) is configured to modulate the control signals by actuating the controllable switch (M1) onto the supply voltage of the lighting device (50).

8. The device (100) as claimed in claim 5, wherein the control circuit (110) has a transistor (M1) as the controllable switch and is configured such that an operating current of the lighting device (50) flows via the transistor (M1), and wherein the control circuit (110) is configured to modulate the control signals by actuating the transistor (M1) onto the supply voltage of the lighting device (50).

9. The device (100) as claimed in claim 5, wherein the control circuit (110) is configured to modulate the control signals by phase gating control and/or phase chopping control by corresponding actuation of the controllable switch (M1) onto the supply voltage of the lighting device (50).

10. The device (100) as claimed in claim 9, wherein the phase gating control or phase chopping control is less than 20% of a period of the supply voltage of the lighting device (50).

11. The device (100) as claimed in claim 9, wherein the phase gating control or phase chopping control takes place in only one half cycle of the supply voltage of the lighting device (50).

12. The device (100) as claimed in claim 9, wherein the control signals are encoded by the presence or absence of a predetermined phase gating control or phase chopping control.

13. The device (100) as claimed in claim 4, wherein the control circuit (110) comprises a semiconductor component (M1) and is configured such that, on actuation of the button (120), an operating current of the lighting device (50) flows via the semiconductor component (M1), and wherein the control circuit (110) is configured to derive the internal supply voltage (Vint) from a voltage drop across the semiconductor component (M1).

14. The device (100) as claimed in claim 4, wherein the control circuit (110) has a controller (150) which is fed by the internal supply voltage (Vint).

15. A method for controlling a lighting device (50), the method comprising:

configuring a control circuit (110) to supply a supply voltage of the lighting device (50) and control signals modulated onto the supply voltage to the lighting device (50), and using the control circuit (110) to modulate the control signals by phase gating control and/or phase chopping control as digitally encoded information items onto the supply voltage of the lighting devices (50), wherein the control signal comprises a start sequence and a stop sequence at the end of the digitally encoded information and wherein the lighting device (50) comprises at least one lamp (54) and a switched mode power supply, which generates supply signals configured to operate the at least on lamp (54) from the supply voltage supplied to the lighting device (50).

* * * * *